(12) United States Patent
Kang et al.

(10) Patent No.: US 7,758,231 B2
(45) Date of Patent: Jul. 20, 2010

(54) BACKLIGHT ASSEMBLY AND DISPLAY APPARATUS HAVING THE SAME

(75) Inventors: Sang-Min Kang, Siheung-si (KR); Jeoung-Gwen Lee, Suwon-si (KR); Yong-Gwang Won, Yongin-si (KR); Tae-Hyung Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 126 days.

(21) Appl. No.: 11/193,658

(22) Filed: Jul. 29, 2005

(65) Prior Publication Data

US 2006/0028839 A1 Feb. 9, 2006

(30) Foreign Application Priority Data

Aug. 6, 2004 (KR) .................. 10-2004-0062140

(51) Int. Cl.
*F21V 7/04* (2006.01)
*G09F 13/04* (2006.01)
(52) U.S. Cl. .............. 362/632; 362/97.1; 362/97.2; 362/97.3; 362/97.4; 362/633; 362/634; 362/330; 362/225; 362/613; 362/614; 349/58
(58) Field of Classification Search ............ 362/600, 362/602, 306, 609, 97.1–97.4, 632–634, 362/330, 225, 613–614; 349/58
See application file for complete search history.

(56) References Cited

U.S. PATENT DOCUMENTS 6,935,766 B2 * 8/2005 Ato ..................... 362/633

| 2001/0006461 | A1* | 7/2001 | Okuno ............... 362/311 |
| 2003/0025850 | A1* | 2/2003 | Nitto et al. ........... 349/58 |
| 2003/0179580 | A1* | 9/2003 | Ito et al. ............. 362/306 |
| 2004/0105250 | A1* | 6/2004 | Leu et al. ............. 362/31 |
| 2004/0130885 | A1  | 7/2004 | Nakano |
| 2004/0169785 | A1* | 9/2004 | You et al. ............. 349/61 |
| 2005/0099604 | A1* | 5/2005 | Mizumaki et al. ..... 353/27 R |
| 2006/0028836 | A1* | 2/2006 | Shin et al. ........... 362/600 |

FOREIGN PATENT DOCUMENTS

JP 2004-117744 4/2004

* cited by examiner

*Primary Examiner*—Sandra L O'Shea
*Assistant Examiner*—Sean P Gramling
(74) *Attorney, Agent, or Firm*—Cantor Colburn LLP

(57) ABSTRACT

A backlight assembly includes a receiving container, a light guide plate, a light source unit, an optical member and a panel-guiding member. The receiving container includes a bottom plate and a sidewall extended from an edge portion of the bottom plate. The light source unit includes a light source generating light and disposed at side face of the light guide plate, and a light reflecting cover that covers the light source to reflect the light generated from the light source toward the side face. The optical member is disposed over the light guide plate. The panel-guiding member has a first plate combined with the sidewall of the receiving container, and a second plate extended from the first plate such that the second plate covers a portion of the optical member and is spaced apart from an upper face of the optical member. Therefore, warpage and cleavage of the optical member are prevented.

21 Claims, 6 Drawing Sheets

BACKLIGHT ASSEMBLY AND DISPLAY APPARATUS HAVING THE SAME

CROSS-REFERENCE TO RELATED APPLICATIONS

This application claims priority to Korean Patent Application No. 2004-62140 filed on Aug. 6, 2004 and all the benefits accruing therefrom under 35 U.S.C. §119, the contents of which are herein incorporated by reference in its entirety.

BACKGROUND OF THE INVENTION

1. Field of the Invention

The present invention relates to a backlight assembly and a display apparatus having the backlight assembly. More particularly, the present invention relates to a backlight assembly preventing warpage of an optical member and a display apparatus having the backlight assembly.

2. Description of the Related Art

A display apparatus converts electric signals processed by an information processing apparatus into images. The display apparatus is characterized either into an active display apparatus that generates light or a passive display apparatus that uses external light to display the image.

Examples of the active display apparatus are a cathode ray tube ("CRT") display apparatus, an organic light emitting display ("OLED") apparatus, etc., and an example of the passive display apparatus is a liquid crystal display ("LCD") apparatus.

The LCD apparatus corresponding to the passive display apparatus does not generate light but uses light in order to display images. Therefore, most LCD apparatuses require a backlight assembly that generates light.

The backlight assembly includes a light source that generates light and an optical member that enhances optical properties of the light generated from the light source. The optical member includes a light guide plate, a light diffusing plate, etc.

The backlight assembly further includes a panel-guiding member. The panel-guiding member fixes the optical member. When the optical member is heated, the optical member is expanded or shrunk resulting in damage to the optical member. The optical member is, for example, warped which deteriorates display quality.

SUMMARY OF THE INVENTION

The present invention provides a backlight assembly preventing warpage and cleavage of an optical member.

The present invention also provides a display apparatus having the above-mentioned backlight assembly.

In an exemplary backlight assembly, the backlight assembly includes a receiving container, a light guide plate, a light source unit, an optical member and a panel-guiding member. The receiving container includes a bottom plate and a sidewall extended from an edge portion of the bottom plate. The receiving container receives the light guide plate. The receiving container receives the light source unit. The light source unit includes a light source that generates light and is disposed at side face of the light guide plate, and a light reflecting cover that covers the light source to reflect the light generated from the light source toward the side face of the light guide plate. The optical member is disposed over the light guide plate. The panel guiding member has a first plate combined with the sidewall of the receiving container, and a second plate extended from the first plate such that the second plate covers a portion of the optical member and spaced apart from an upper face of the optical member.

In an exemplary display apparatus, the display apparatus includes a receiving container, a light guide plate, a light source unit, an optical member, a panel-guiding member and a display panel. The receiving container includes a bottom plate and a sidewall extended from an edge portion of the bottom plate. The receiving container receives the light guide plate. The receiving container receives the light source unit. The light source unit includes a light source that generates light and is disposed at side face of the light guide plate, and a light reflecting cover that covers the light source to reflect the light generated from the light source toward the side face of the light guide plate. The optical member is disposed over the light guide plate. The panel-guiding member has a first plate combined with the sidewall of the receiving container, and a second plate extended from the first plate such that the second plate covers a portion of the optical member and spaced apart from an upper face of the optical member. The display panel is supported by the panel-guiding member, and converts the light into an image.

The optical member in the embodiments disclosed herein is separated from the panel-guiding member. Therefore, warpage and cleavage of the optical member caused by expansion or shrinkage are prevented. Therefore, a display quality is maintained.

In an embodiment described herein, a backlight assembly for preventing warpage and cleavage of an optical member includes an optical member having at least one of a diffusion sheet, a prism sheet, and a brightness enhancing film, wherein the optical member is susceptible to expansion or shrinkage during temperature changes within the backlight assembly and a panel-guiding member for maintaining the optical member within the backlight assembly, wherein the panel-guiding member is spaced from the optical member by a distance that allows the optical member to expand within the backlight assembly without resulting in warpage or cleavage of the optical member.

A method for preventing warpage and cleavage within an optical member of a backlight assembly includes providing an optical member upon a light exiting face of a light guide plate, the optical member provided for enhancing optical properties of light exiting the light guide plate, providing a panel-guiding member within the backlight assembly for fixing the optical member within the backlight member, and, spacing the panel-guiding member from the optical member by a distance sufficient for allowing expansion of the optical member within the backlight assembly without causing warpage or cleavage of the optical member.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Figure 1:
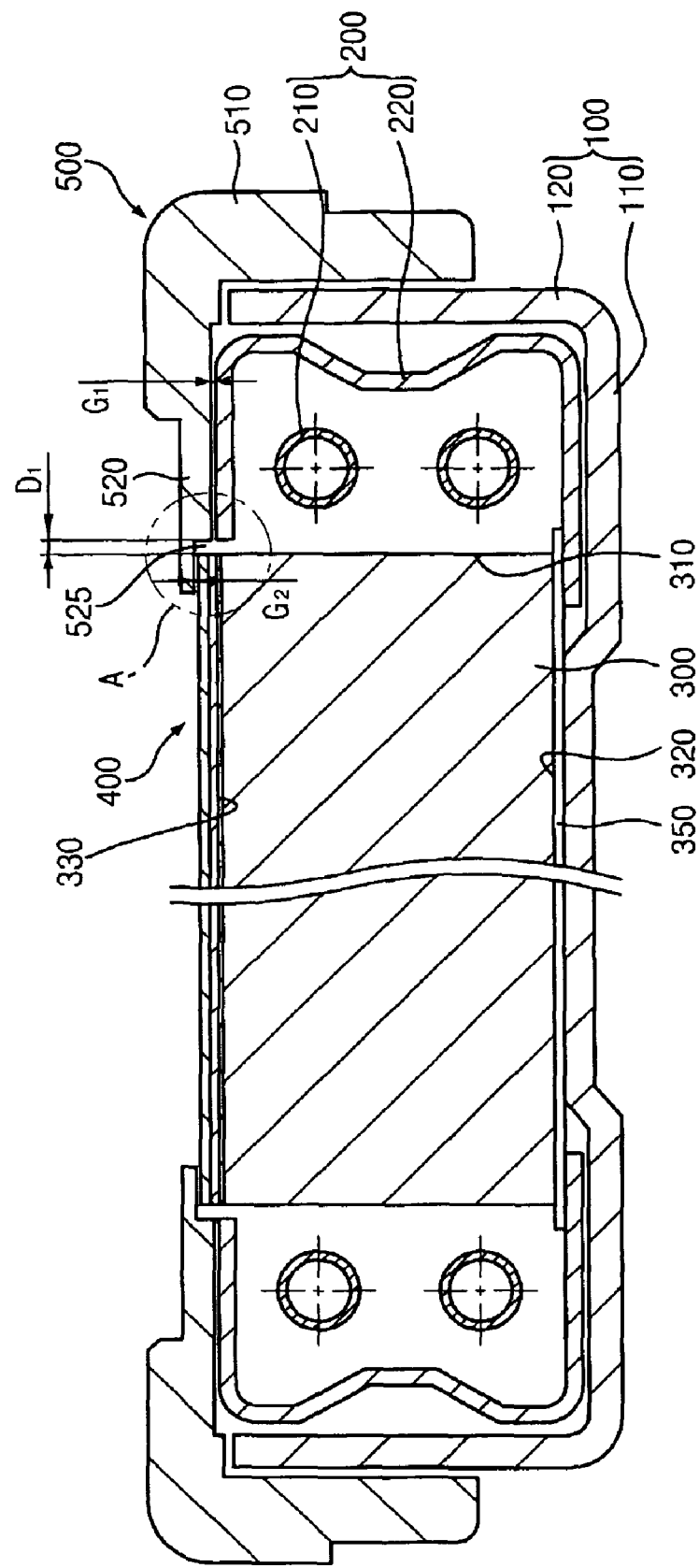
FIG. 1 is a cross-sectional view illustrating a backlight assembly according to an exemplary embodiment of the present invention.

Hereinafter, the embodiments of the present invention will be described in detail with reference to the accompanied drawings. In the drawings, the thickness of layers, films, and regions are exaggerated for clarity. It will be understood that when an element such as a layer, film, region, or substrate is referred to as being "on" another element, it can be directly on the other element or intervening elements may also be present.

Figure 2:
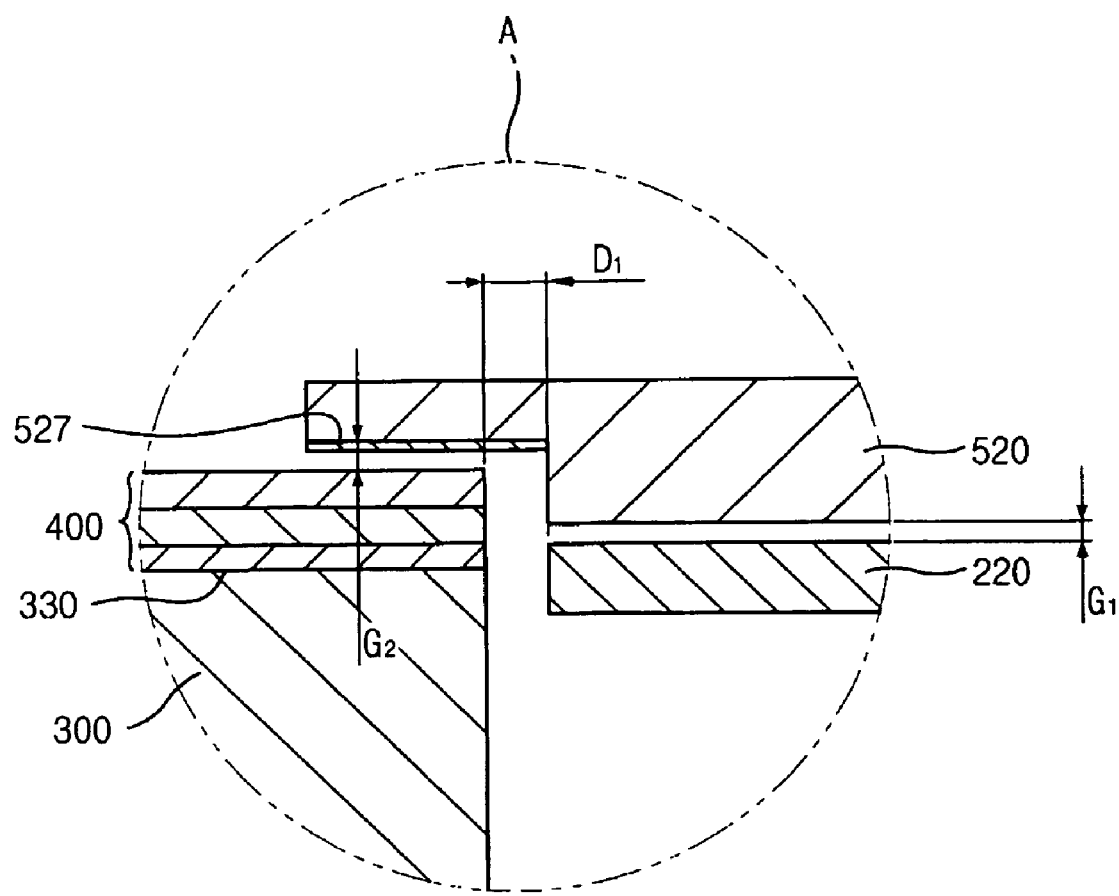
FIG. 2 is an enlarged view illustrating portion 'A' in FIG. 1.

FIG. 1 is a cross-sectional view illustrating a backlight assembly according to an exemplary embodiment of the present invention, and FIG. 2 is an enlarged view illustrating portion 'A' in FIG. 1.

Referring to FIGS. 1 and 2, a backlight assembly according to one embodiment includes a receiving container 100, a light source unit 200, a light guide plate 300, an optical member 400 and a panel-guiding member 500.

The receiving container 100 includes a bottom plate 110 and a sidewall 120. The receiving container 100 may be made of, for example, metal. The bottom plate 110 can have a rectangular plate shape. The sidewall 120 is extended from edge portions of the bottom plate 110 to define a receiving space therein.

The light source unit 200 is disposed in the receiving space of the receiving container 100. The light source unit 200 is disposed within a side portion of the receiving container 100. Two light source units 200 may be disposed within both side portions of the receiving container 100 such that the light source units 200 face each other with the light guide plate 300 interposed therebetween as shown in FIG. 1. Although two light source units 200 are illustrated, it would be within the scope of this embodiment to utilize more or less light source units 200 within the receiving container 100.

The light source unit 200 includes a light source 210 and a light reflecting cover 220. The light source 210 may employ a cold cathode fluorescent lamp ("CCFL") having a cylindrical shape. Alternatively, the light source 210 may employ an external electrode fluorescent lamp ("EEFL") of which electrodes are formed on an external surface of end portions of a lamp body. The EEFL has merits such as low power consumption and a quality of easily performing parallel driving. Although two particular light sources 210 are described for use within the light source unit 200, other suitable light sources 210 may also be employed within the light source unit 200.

The light reflecting cover 220 covers the light source 210 such that the light reflecting cover 220 reflects light generated from the light source 210 and advances the light from the light reflecting cover 220 towards the light guide plate 300. The light reflecting cover 220 includes material that has high optical reflectivity and radiates heat well. The light reflecting cover 220 may include metal, such as, but not limited to, brass.

The light guide plate 300 changes a path of light from a horizontal direction, substantially parallel to the bottom plate 110 of the receiving container 100, to a vertical direction, substantially parallel to a sidewall 120 of the receiving container 100, to enhance luminance uniformity.

The light guide plate 300 includes side faces, a light reflecting face 320 and a light exiting face 330. The side faces include light incident faces 310 facing the light source 210. The light reflecting face 320 faces the bottom plate 110 of the receiving container 100. The light exiting face 330 is opposite the light reflecting face 320.

Light generated from the light source unit 200 enters the light guide plate 300 through the light incident faces 310. A first portion of the light may exit the light guide plate 300 through the light exiting face 330 according to Snell's law. The relationship between the angles of incidence and refraction and the indices of refraction of two medium is known as Snell's law. The relationship may be written as: $n_i * \sin(\theta_i) = n_r * \sin(\theta_r)$ where $\theta_i$ is the angle of incidence, $\theta_r$ is the angle of refraction, $n_i$ is the index of refraction of the incident medium, and $n_r$ is the index of refraction of the refractive medium.

A second portion of the light may exit the light guide plate 300 through the light reflecting face 320. Therefore, a light reflecting material may be coated on the light reflecting face 320 of the light guide plate 300. Alternatively, a light reflecting plate 350 may be interposed between the bottom plate 110 of the receiving container 100 and the light reflecting face 320, or the bottom plate 110 may reflect the second portion of the light, such as by forming the bottom plate 110 from a reflective material or by applying a reflective coating to the bottom plate 110.

The first portion of the light exits the light guide plate 300 such that a path of the first portion of light forms an acute angle with respect to the light exiting face 330. Therefore, the optical member 400 that changes the path of the first portion of the light forms a right angle with respect to the light incident face 310 and is disposed over the light exiting face 330 of the light guide plate 300.

The optical member 400 also enhances luminance uniformity.

The optical member 400 has a sheet shape with a thin thickness. The optical member 400 includes, for example, a diffusion sheet, a prism sheet, a brightness enhancing film ("BEF"), etc.

The diffusion sheet diffuses light that exits the light guide plate 300 through the light exiting face 330 to enhance luminance uniformity. The prism sheet changes a path of light such that a light-exiting angle approaches a right angle. The BEF also enhances luminance.

The panel-guiding member 500 extends from the sidewall 120 of the receiving container 100. The panel-guiding member 500 includes first and second plates 510 and 520.

The first plate 510 of the panel-guiding member 500 has a plate shape. The first plate 510 can be combined with the sidewall 120 of the receiving container 100 by using a mechanical connection, such as, but not limited to, a hook combination.

The second plate 520 of the panel-guiding member 500 extends from the first plate 510 such that the second plate 520 is substantially parallel with the light exiting face 330 of the light guide plate 300. The second plate 520 covers an upper portion of the light reflecting cover 220. A portion of the second plate 520 overlaps both the light guide plate 300 and the optical member 400 disposed over the light guide plate 300. The portion of the second plate 520, which overlaps the optical member 400, is spaced apart from the optical member 400. By overlapping the optical member 400, the second plate 520 fixes the optical member 400 within the backlight assembly, that is, the optical member 400 is maintained within the backlight assembly.

The second plate 520 may include a stepped portion 525 that spaces the second plate 520 apart from the optical member 400.

Therefore, in the event the optical member 400 experiences shrinkage or expansion, warpage and cleavage of the optical member 400 may be prevented.

If the second plate 520 of the panel-guiding member 500 is compressed towards the light guide plate 300, the second plate 520 may make contact with the optical member 400.

In order to prevent such contact between the second plate 520 and the optical member 400, the first plate 510 of the panel guiding member 500 is fixed to the sidewall 120 of the receiving container 100 such that the second plate 520 is spaced apart from an upper portion of the light reflecting cover 220 to form a first gap G1 and the second plate 520 is spaced apart from an upper portion of the optical member 400 to form a second gap G2 that is greater than the first gap G1. As shown in FIGS. 1 and 2, it is the stepped portion 525 of the second plate 520 that is spaced from the optical member 400 by the second gap G2. The stepped portion 525 can be a reduced portion of the second plate 520, that is, as illustrated, the second plate 520 has a reduced thickness in the area of the stepped portion 525, as compared to a portion of the second plate 520 that is adjacent to the stepped portion 525. The portion of the second plate 520 that is adjacent to the stepped portion 525 overlies the light reflecting cover 220. Any space formed between the light reflecting cover 220 and the light incident face 310 may be covered by the stepped portion 525 of the second plate 520. While the stepped portion 525 is illustrated as having a reduced thickness, it would also be within the scope of this invention for the portion adjacent the stepped portion to have a similar thickness, i.e. via a cutaway portion on the top of the second plate 520. The stepped portion 525 includes a surface facing the optical member 400, wherein this surface is spaced from the optical member 400 by a gap G2, the portion of the second plate adjacent the stepped portion 525 includes a surface facing the light reflecting cover 220, wherein this surface is spaced from the light reflecting cover 220 by a gap G1, and an intermediate wall is formed between the spaced surfaces. The intermediate wall faces an edge of the optical member 400.

The first gap G1 is, for example, in a range from about 0.05 mm to about 0.1 mm, and the second gap G2 is, for example, in a range from about 0.05 mm to about 0.3 mm. While exemplary ranges are described, it should be understood that a backlight assembly having varying dimensions may require gaps having smaller or larger dimensions than the described ranges.

In order to prevent the optical member 400 from drifting from the second plate 520, the optical member 400 has substantially the same shape and area as that of the light guide plate 300.

Additionally, a side portion, which may be substantially parallel with light incident face 310, of the optical member 400 is spaced apart from the intermediate wall between the stepped portion 525 of the second plate 520 and the portion adjacent the stepped portion 525 by a first distance D1. Therefore, the side portion of the optical member 400 does not make contact with the second plate 520 even if the optical member 400 is expanded. The width of the gap G2 and the distance D1 may be no less than what is necessary to prevent warpage or cleavage of the optical member 400 if expanded. If an amount of maximum expansion potential of the optical member 400 is determined, then the gap G2 and the distance D1 may be set to be equal to or greater than such an amount. For example, if it is known that the optical member 400 is capable of expanding 0.1 mm in width and 0.2 mm in length, then the gap G2 can be greater than or equal to 0.1 mm and the distance D1 can be greater than or equal to 0.2 mm. It is also possible that the gap G2 and the distance D1 could be slightly less than the amount of maximum expansion potential, so long as the optical member 400 does not experience warpage or cleavage during expansion. Referring to FIG. 2, light may be leaked through gaps formed between the optical member 400 and the second plate 520 of the panel-guiding member 500, even though warpage and cleavage may be prevented by the gaps.

In order to prevent leakage of light, a light absorbing film 527 is disposed on an inner face of the second plate 520 of the panel-guiding member 500, such as on the surface of the stepped portion 525 that faces the optical member 400. The light absorbing film 527 absorbs light to reduce the leakage of light.

Figure 3:
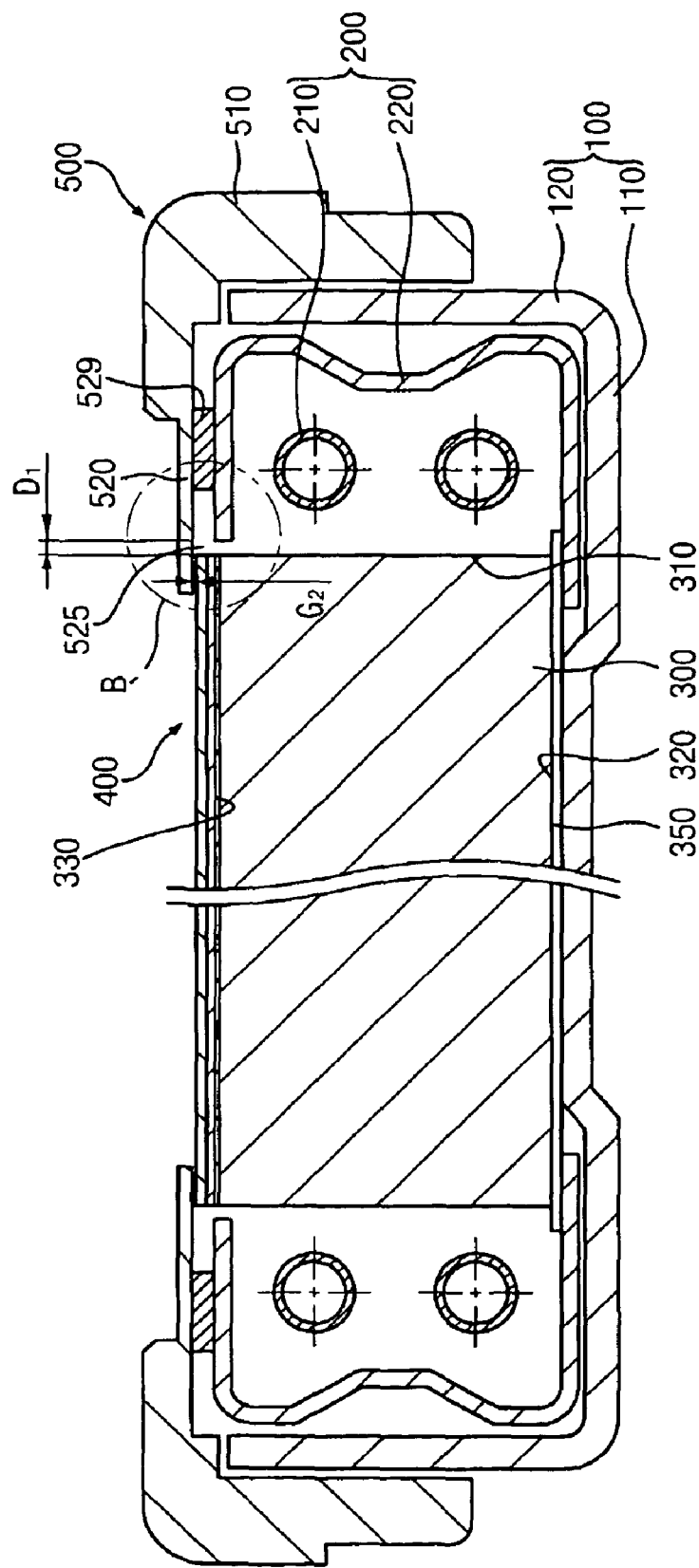
FIG. 3 is a cross-sectional view illustrating a backlight assembly according to another exemplary embodiment of the present invention.
Figure 4:
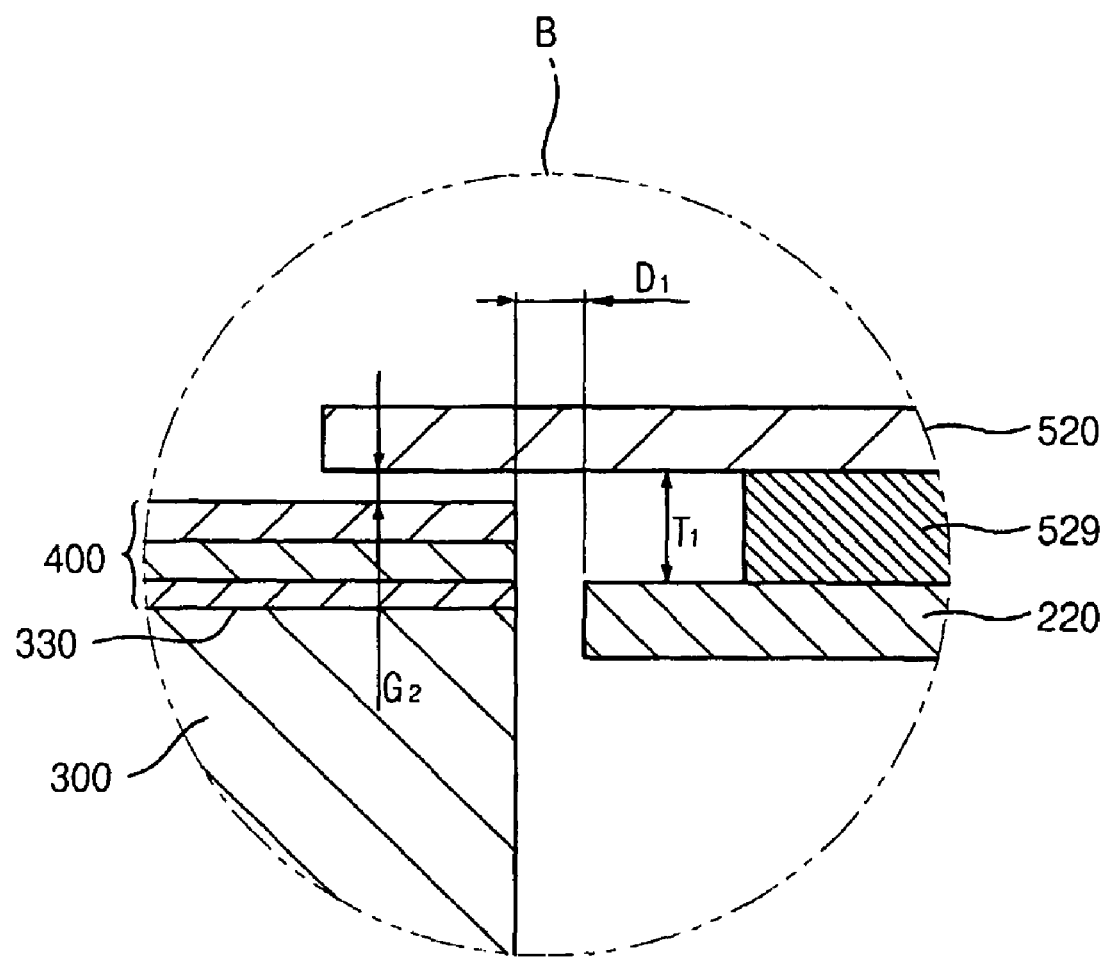
FIG. 4 is an enlarged view illustrating portion 'B' in FIG. 3.

FIG. 3 is a cross-sectional view illustrating a backlight assembly according to another exemplary embodiment of the present invention, and FIG. 4 is an enlarged view illustrating portion 'B' in FIG. 3. The backlight assembly of this embodiment is the same as shown in FIGS. 1 and 2 except for a panel-guiding member. Thus, the same reference numerals will be used to refer to the same or like parts as those described with respect to FIGS. 1 and 2 and any further explanation will be omitted.

Referring to FIGS. 3 and 4, a spacer 529 is interposed between the second plate 520 of the panel-guiding member 500 and the optical member 400. The spacer 529 prevents contact between the second plate 520 and the optical member 400.

The spacer 529 has sufficient thickness T1 for preventing the contact between the second plate 520 and the optical member 400. The thickness T1 can be chosen such that the size of the second gap G2 is maintained. The spacer 529 may include flexible material, such as, but not limited to, rubber.

The spacer 529 may be attached to an inner surface of the second plate 520. Alternatively, the spacer 529 may be attached to an upper surface of the light reflecting cover 220.

Thus, the spacer 529 eliminates the need to form a stepped portion 525 into the second plate 520 as in the embodiment shown in FIG. 1. Similar to portion of the second plate 520 adjacent the stepped portion 525 and the intermediate wall of the prior embodiment, the spacer 529 includes a wall that faces the edge of the optical member 400, and includes a surface that faces the light reflecting cover 220. An edge of the upper portion of the light reflecting cover 220 may still be spaced from the optical member 400 by a first distance D1 for preventing the optical member 400 from making contact with the light reflecting cover 220 if the optical member 400 expands. The spacer 529 does not enter the space (shown as first distance D1) between the optical member 400 and the light reflecting cover 220 so that the optical member 400 also does not make contact with the spacer 529 during expansion.

Figure 5:
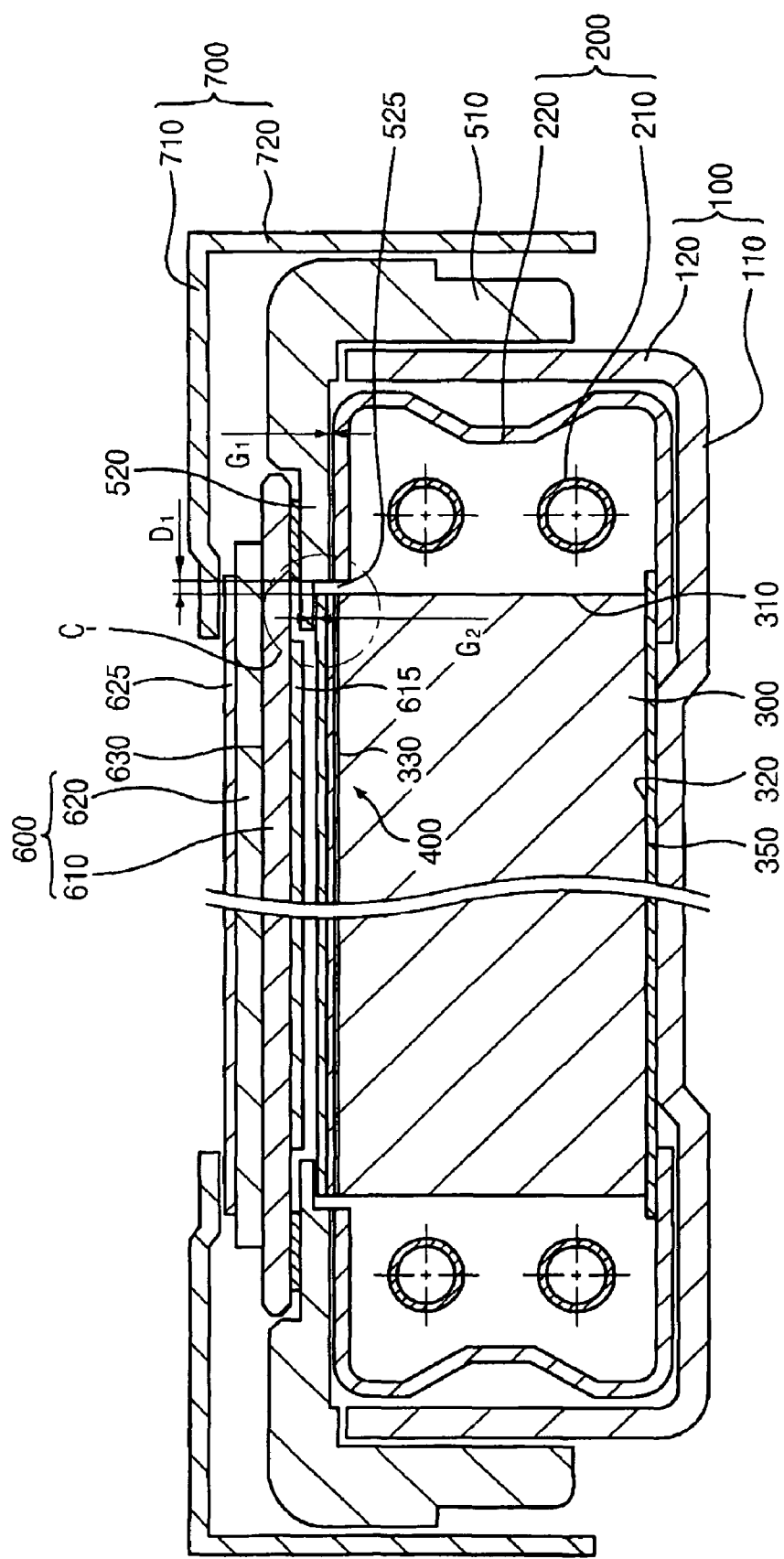
FIG. 5 is a cross-sectional view illustrating a display apparatus according to an exemplary embodiment of the present invention.
Figure 6:
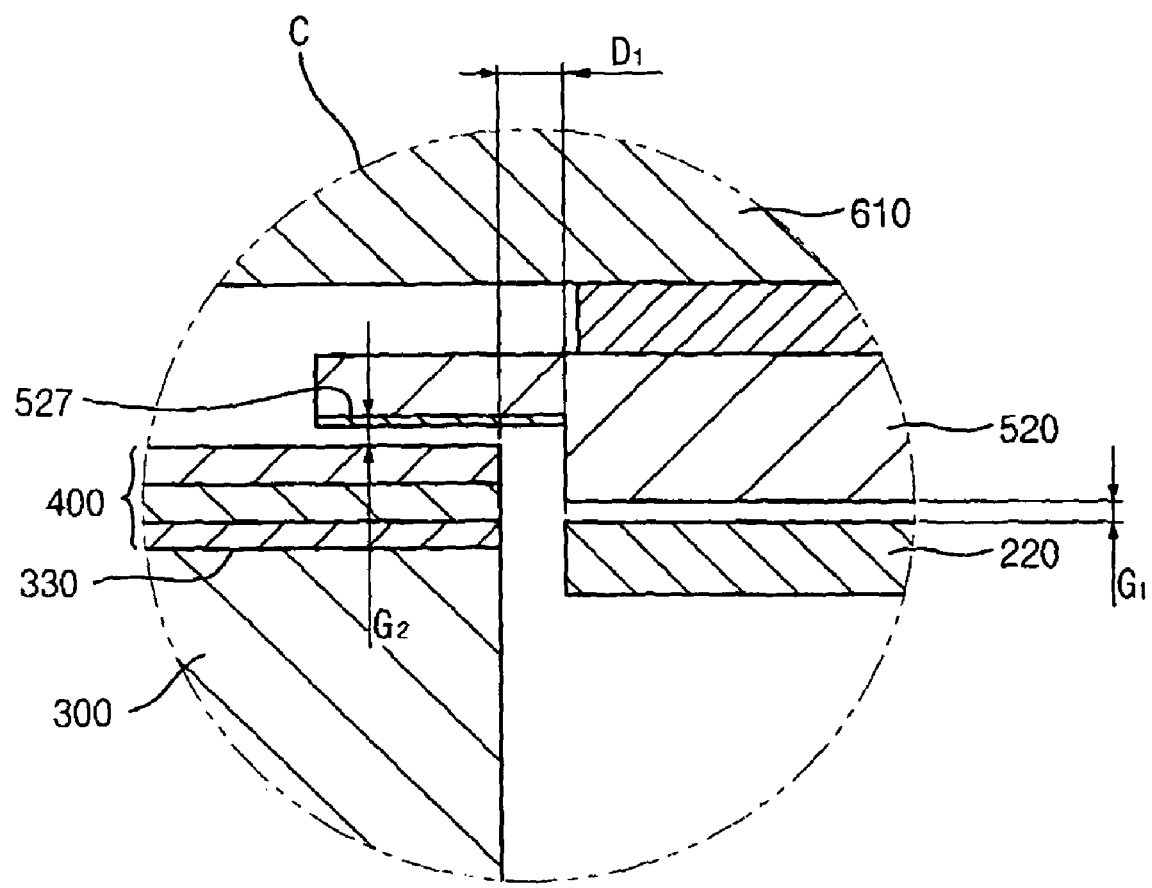
FIG. 6 is an enlarged view illustrating portion 'C' in FIG. 5.

FIG. 5 is a cross-sectional view illustrating a display apparatus according to an exemplary embodiment of the present invention, and FIG. 6 is an enlarged view illustrating portion 'C' in FIG. 5. The display apparatus employs a backlight assembly that is the same as in either of the embodiments shown in FIGS. 1 and 2, and in FIGS. 3 and 4. Thus, the same reference numerals will be used to refer to the same or like parts as those described in FIGS. 1-4 and any further explanation will be omitted.

Referring to FIGS. 5 and 6, a display panel 600 is disposed on the second plate 520 of the panel-guiding member 500. The display panel 600 includes a thin film transistor ("TFT") substrate 610, a color filter substrate 620 and a liquid crystal ("LC") layer 630 interposed between the TFT substrate 610 and the color filter substrate 620.

A display apparatus further includes a first light polarizing plate 615 disposed on a surface of the TFT substrate 610 opposite the surface of the TFT substrate 610 that faces the color filter substrate 620, and a second light polarizing plate 625 disposed on a surface of the color filter substrate 620 opposite the surface of the color filter substrate 620 that faces the TFT substrate 610.

The display apparatus further includes a top chassis 700 that prevents the display panel 600 from drifting from the panel-guiding member 500. The top chassis 700 includes a first chassis portion 710 that surrounds edge portions of the display panel 600, and a second chassis portion 720 extended from an edge portion of the first chassis portion 710 such that the second chassis portion 720 is substantially parallel with the sidewall 120 of the receiving container 100.

The second chassis portion 720 may be combined with the sidewall 120 of the receiving container 120 through any known mechanical or other connection, such as, but not limited to, a hook combination.

According to the embodiment disclosed herein, the optical member 400 is separated from the panel-guiding member 500. Therefore, warpage and cleavage of the optical member 400 caused by expansion or shrinkage are prevented. Therefore, display quality is maintained.

In view of the above-described embodiments, a method for preventing warpage and cleavage within an optical member of a backlight assembly is made possible and includes, in part, providing an optical member upon a light exiting face of a light guide plate, the optical member provided for enhancing optical properties of light exiting the light guide plate, providing a panel-guiding member within the backlight assembly for fixing the optical member within the backlight member, and spacing the panel-guiding member from the optical member by a distance sufficient for allowing the expansion of the optical member within the backlight assembly without causing warpage or cleavage of the optical member. Having described the exemplary embodiments of the present invention and its advantages, it is noted that various changes, substitutions and alterations can be made herein without departing from the spirit and scope of the invention as defined by appended claims. Moreover, the use of the terms first, second, etc. do not denote any order or importance, but rather the terms first, second, etc. are used to distinguish one element from another. Furthermore, the use of the terms a, an, etc. do not denote a limitation or quantity, but rather denote the presence of at least one o the referenced item.

What is claimed is:

1. A backlight assembly comprising:
a receiving container including a receiving container plate and a sidewall extended from an edge portion of the receiving container plate;
a light guide plate received by the receiving container;
a light source unit received by the receiving container, the light source unit including a light source that generates light and disposed adjacent to an incident side face of the light guide plate, and a light reflecting cover that covers the light source to reflect the light generated from the light source towards the incident side face of the light guide plate;
an optical member disposed over the light guide plate, the optical member having a first face facing the light guide plate and an opposing second face; and
a panel-guiding member having a first plate combined with the sidewall of the receiving container, and a second plate extended from the first plate, wherein the second plate covers a portion of the optical member, faces side faces of the optical member and is spaced apart from the second face of the optical member,
wherein the light reflecting cover comprises upper and lower plate portions which are substantially parallel with the receiving container plate and interpose the light source therebetween, and a connection portion connecting the upper and lower plate portions with each other,
wherein the second plate of the panel guiding member combined with the sidewall of the receiving container provides a first gap formed between the second plate and the upper plate portion of the light reflecting cover, and a second gap formed between the second plate and the second face of the optical member, the second gap being greater than the first gap, and
wherein the first gap is in a range from about 0.05 millimeter (mm) to about 0.1 millimeter (mm), and the second gap is in a range from about 0.05 mm to about 0.3 mm.

2. The backlight assembly of claim 1, wherein the second plate of the panel-guiding member comprises a stepped portion to separate the optical member from the second plate.

3. The backlight assembly of claim 1, wherein the optical member has substantially a same area and shape as that of a light exiting face of the light guide plate.

4. The backlight assembly of claim 1, further comprising a light absorbing member formed on the second plate such that the light absorbing member absorbs light leaked through gaps between the second plate of the panel guiding member and the optical member.

5. The backlight assembly of claim 1, further comprising a spacer interposed between the second plate and the light reflecting cover to separate the optical member from the second plate of the panel-guiding member.

6. The backlight assembly of claim 5, wherein the spacer is attached to the light reflecting cover.

7. The backlight assembly of claim 5, wherein the spacer is attached to the second plate.

8. A display apparatus comprising:
a receiving container including a receiving container plate and a sidewall extending from an edge portion of the receiving container plate;
a light guide plate received by the receiving container;
a light source unit received by the receiving container, the light source unit including a light source that generates light and disposed adjacent to an incident side face of the light guide plate, and a light reflecting cover that covers the light source to reflect the light generated from the light source towards the incident side face of the light guide plate;
an optical member disposed over the light guide plate, the optical member having a first face facing the light guide plate and an opposing second face;
a panel guiding member having a first plate combined with the sidewall of the receiving container, and a second plate extended from the first plate, wherein the second plate covers a portion of the optical member, faces side faces of the optical member and is spaced apart from the second face of the optical member; and
a display panel supported by the panel-guiding member, the display panel converting the light into an image,
wherein the light reflecting cover comprises upper and lower plate portions which are substantially parallel with the receiving container plate and interpose the light source therebetween, and a connection portion connecting the upper and lower plate portions with each other,
wherein the second plate of the panel guiding member combined with the sidewall of the receiving container forms a first gap between the second plate and the upper plate portion of the light reflecting cover, and a second gap between the second plate and the second face of the optical member, the second gap being greater than the first gap, and wherein the first gap is in a range from about 0.05 millimeter (mm) to about 0.1 millimeter (mm), and the second gap is in a range from about 0.05 mm to about 0.3 mm.

9. The display apparatus of claim 8, wherein the second plate of the panel-guiding member comprises a stepped portion to form a gap between the optical member and the second plate.

10. The display apparatus of claim 8, wherein the optical member has substantially a same area and shape as that of a light exiting face of the light guide plate.

11. The display apparatus of claim 8, further comprising a light absorbing member formed on the second plate such that the light absorbing member absorbs light leaked through gaps between the second plate of the panel guiding member and the optical member.

12. The display apparatus of claim 8, further comprising a spacer interposed between the second plate and the light reflecting cover to separate the optical member from the second plate of the panel-guiding member.

13. The display apparatus of claim 12, wherein the spacer is attached to the light reflecting cover.

14. The display apparatus of claim 12, wherein the spacer is attached to the second plate.

15. A backlight assembly for preventing warpage and cleavage of an optical member, the backlight assembly comprising:
a receiving container including a receiving container plate and a sidewall extended from an edge portion of the receiving container plate;
a light guide plate including an incident side face;
a light source unit including a light source generating light and disposed adjacent to the incident side face of the light guide plate, and a light reflecting cover covering the light source and reflecting the light generated from the light source towards the incident side face of the light guide plate;
an optical member including at least one of a diffusion sheet, a prism sheet, and a brightness enhancing film, wherein the optical member is susceptible to expansion or shrinkage during temperature changes within the backlight assembly; and
a panel-guiding member for maintaining the optical member within the backlight assembly, the panel-guiding member having a first plate combined with the sidewall of the receiving container, and a second plate extended from the first plate, the second plate covering a portion of the optical member and facing side faces of the optical member, wherein the panel-guiding member is spaced from the optical member by a distance that allows the optical member to expand within the backlight assembly without resulting in warpage or cleavage of the optical member,
wherein the light reflecting cover comprises upper and lower plate portions which are substantially parallel with the receiving container plate and interpose the light source therebetween, and a connection portion connecting the upper and lower plate portions with each other,
wherein the second plate of the panel guiding member combined with the sidewall of the receiving container forms a first gap between the second plate and the upper plate portion of the light reflecting cover, and a second gap between the second plate and optical member, the second gap being greater than the first gap,
wherein the first gap is in a range from about 0.05 millimeter (mm) to about 0.1 millimeter (mm), and the second gap is in a range from about 0.05 mm to about 0.3 mm.

16. The backlight assembly of claim 15, wherein the optical member includes a surface overlying a light exiting face of the light guide plate, and further wherein all other surfaces of the optical member are spaced from elements within the backlight assembly to allow for expansion of the optical member.

17. The backlight assembly of claim 15, wherein the distance that allows the optical member to expand within the backlight assembly without resulting in warpage or cleavage of the optical member is greater than or equal to an amount of maximum expansion potential of the optical member.

18. The backlight assembly of claim 15, further comprising a receiving container for receiving a light source unit and a light guide plate for directing light from the light source unit to the optical member, wherein the panel-guiding member is set in position relative to the optical member by the receiving container.

19. The backlight assembly of claim 18, wherein the panel-guiding member includes a first plate attached to a sidewall of the receiving container, and wherein the panel-guiding member includes a second plate partially overlapping and spaced apart from the optical member.

20. A method for preventing warpage and cleavage within an optical member of a backlight assembly, the method comprising:
disposing a light source unit and a light guide plate within a receiving container including a receiving container plate and a sidewall extended from an edge portion of the receiving container plate, the light source unit disposed adjacent to an incident side face of the light guide plate, and the light source unit including a light source generating light and a light reflecting cover covering the light source;
providing an optical member upon a light exiting face of the light guide plate, the optical member provided for enhancing optical properties of light exiting the light guide plate;
providing a panel-guiding member within the backlight assembly for fixing the optical member within the backlight member, the panel-guiding member having a first plate combined with the sidewall of the receiving container, and a second plate extended from the first plate, the second plate covering a portion of the optical member and facing side faces of the optical member; and
spacing the panel-guiding member from the optical member by a distance sufficient for allowing expansion of the optical member within the backlight assembly without causing warpage or cleavage of the optical member;
wherein the light reflecting cover comprises upper and lower plate portions which are substantially parallel with the receiving container plate and interpose the light source therebetween, and a connection portion connecting the upper and lower plate portions with each other,
wherein the second plate of the panel guiding member combined with the sidewall of the receiving container forms a first gap between the second plate and the upper plate portion of the light reflecting cover, and a second gap between the second plate and the optical member, the second gap being greater than the first gap, and
wherein the first gap is in a range from about 0.05 millimeter (mm) to about 0.1 millimeter (mm), and the second gap is in a range from about 0.05 mm to about 0.3 mm.

21. The method of claim 20, further comprising:
determining an amount of maximum expansion potential of the optical member;
wherein spacing the panel-guiding member from the optical member by a distance sufficient for allowing the expansion of the optical member within the backlight assembly comprises spacing the panel-guiding member from the optical member by a distance no less than the amount of maximum expansion potential of the optical member.

* * * * *